Nov. 13, 1934.  N. TRBOJEVICH  1,980,237
WORM GEARING
Filed Jan. 26, 1931   3 Sheets-Sheet 1

INVENTOR
Nikola Trbojevich
BY Whittemore, Hulbert, Whittemore
& Belknap
ATTORNEYS

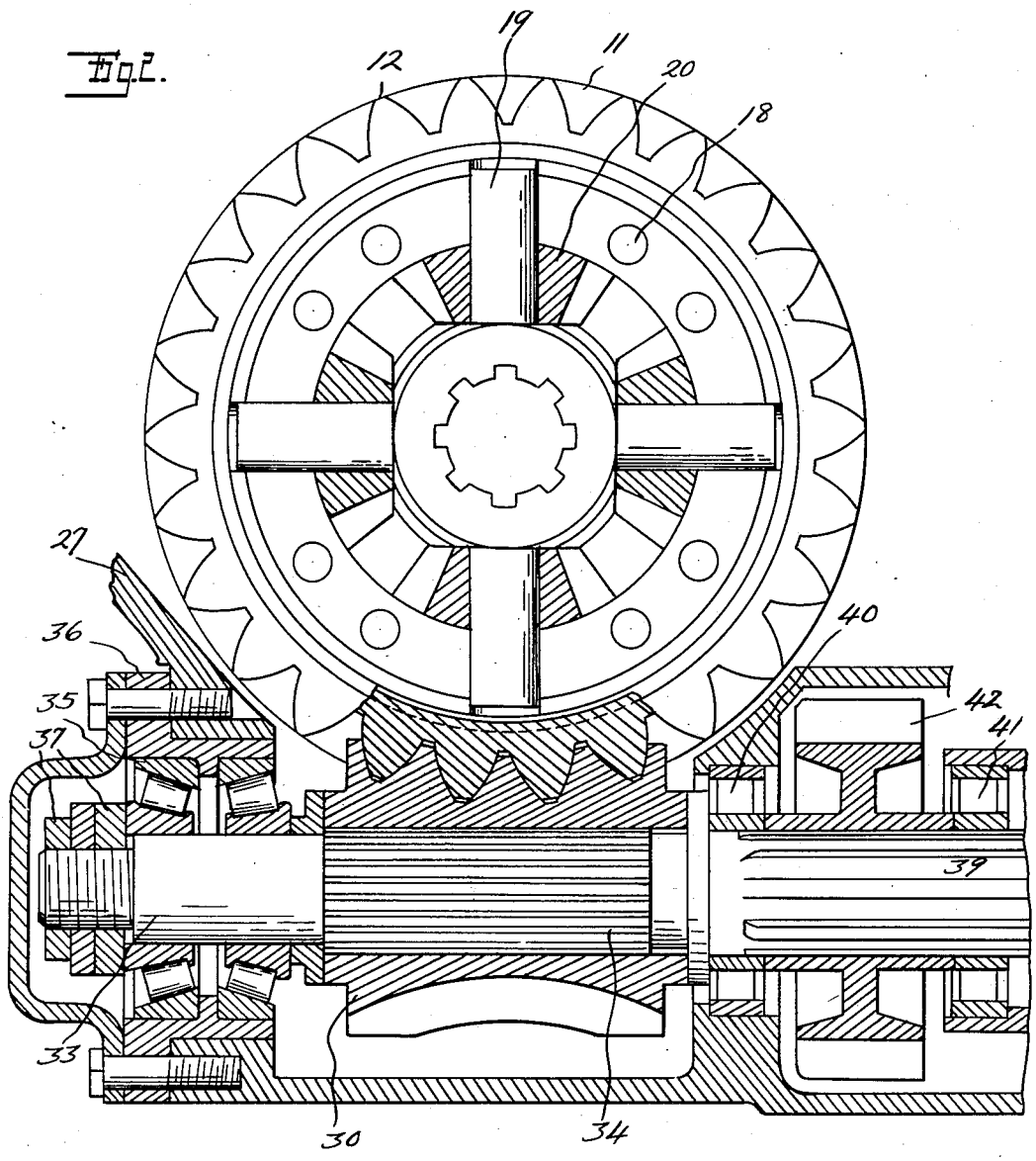

Nov. 13, 1934.  N. TRBOJEVICH  1,980,237
WORM GEARING
Filed Jan. 26, 1931  3 Sheets-Sheet 3
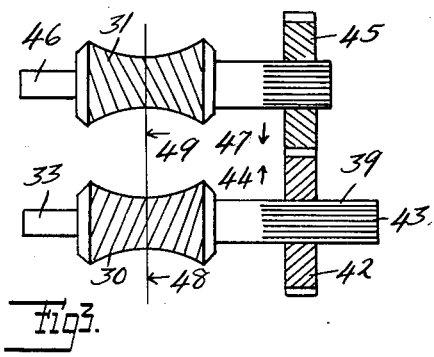
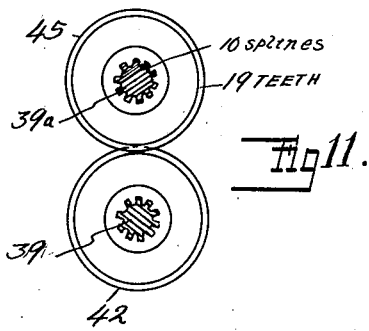
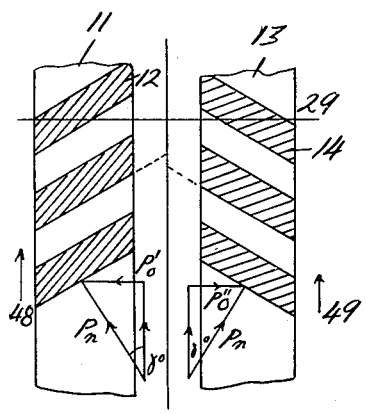
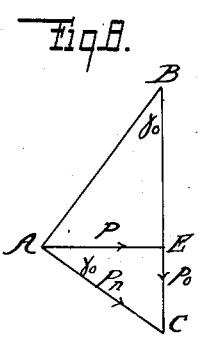
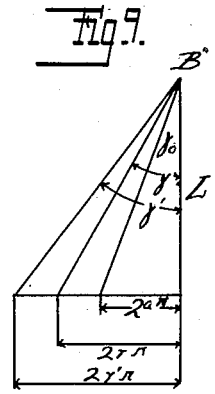
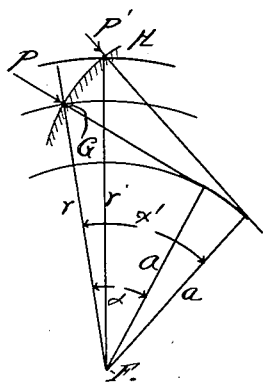
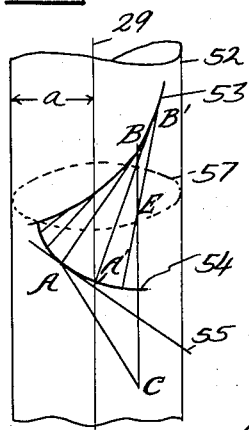
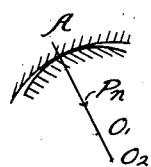
INVENTOR
Nikola Trbojevich
BY Whittemore Hulbert Whittemore
+ Belknap
ATTORNEYS Patented Nov. 13, 1934

1,980,237

UNITED STATES PATENT OFFICE 1,980,237

WORM GEARING

Nikola Trbojevich, Detroit, Mich.

Application January 26, 1931, Serial No. 511,413

9 Claims. (Cl. 74—41)

The invention relates to worm gearing of the globoid type. The application is a continuation of my applications, Serial Nos. 277,693 filed May 14, 1928 and 436,571 filed March 17, 1930.

In the said two applications I disclosed a worm drive in which the globoid worm has concave tooth flanks in the axial plane thereof of a variable radius of curvature formed in the manner of a series of inverted involutes, while the mating wheel has convex helical teeth of a constant cross section throughout their lengths.

A peculiarity of this drive is that the sum of the normal tooth loadings is directly proportional to the torque regardless of the manner in which the contacts are distributed over the mating faces. This is accomplished by so designing the mating faces that at any possible phase of engagement the common normals drawn at the points of contact are always equidistant from and inclined at the same angle relative to the wheel axis.

I discovered that the above geometrical property further results in the fact that in my gearing the end thrust as measured along the wheel axis is strictly constant for a constant torque regardless of the load distribution. I also discovered that owing to the favorable location and formation of the zone of contact which now extends longitudinally of the worm axis, I am enabled to employ bronze worms to mate with steel wheels without causing pitting, abrasion or indentation in the bronze surfaces. By this means I save approximately two-thirds of the bronze formerly required in worm drives of a similar capacity.

This invention resides in a combination comprising two pairs of worms and wheels of the indicated type interconnected by a pair of spur gears in such a manner that the worms will rotate in unison but in opposite directions, while the wheels will rotate in unison and in the same direction. Therefore, I rivet the two wheels together, permit them to float along their axis and obtain a worm drive in which there is no end thrust along the wheel axis and in which the tooth loads are automatically equalized at any instant, in both pairs.

The object of this invention is to construct worm gearing of the heavy duty duplex type whereby a greater torque may be transmitted from two given centers and in a given space than formerly.

Another object is to construct gearing which is quiet, efficient and readily manufactured.

Another object is to provide an improved drive for rear axles of automobiles whereby the weight and the overall dimensions of the axle housing may be substantially reduced. Another object is to reduce the quantity of the bronze required to a minimum thereby materially reducing the first cost.

In the drawings

Figure 1 shows the elevation of my improved gearing as adapted to an automotive axle;

Figure 2 is the section 2—2 of Figure 1;

Figure 3 is a diagrammatic plan view of Figure 1, the helical wheels removed;

Figures 4 and 5 are diagrams explaining the geometry of the tooth surfaces;

Figures 6, 7, 8 and 9 are diagrams relating to tooth loadings from which the Equations 1 to 10 were deduced;

Figure 10 is a diagram explaining the principle of canceling the end thrust in the wheel axis;

Figure 11 is a diagrammatic front view of Figure 3 showing the selection of numbers of teeth and splines to facilitate the assembling of the parts.

Figures 1, 4:
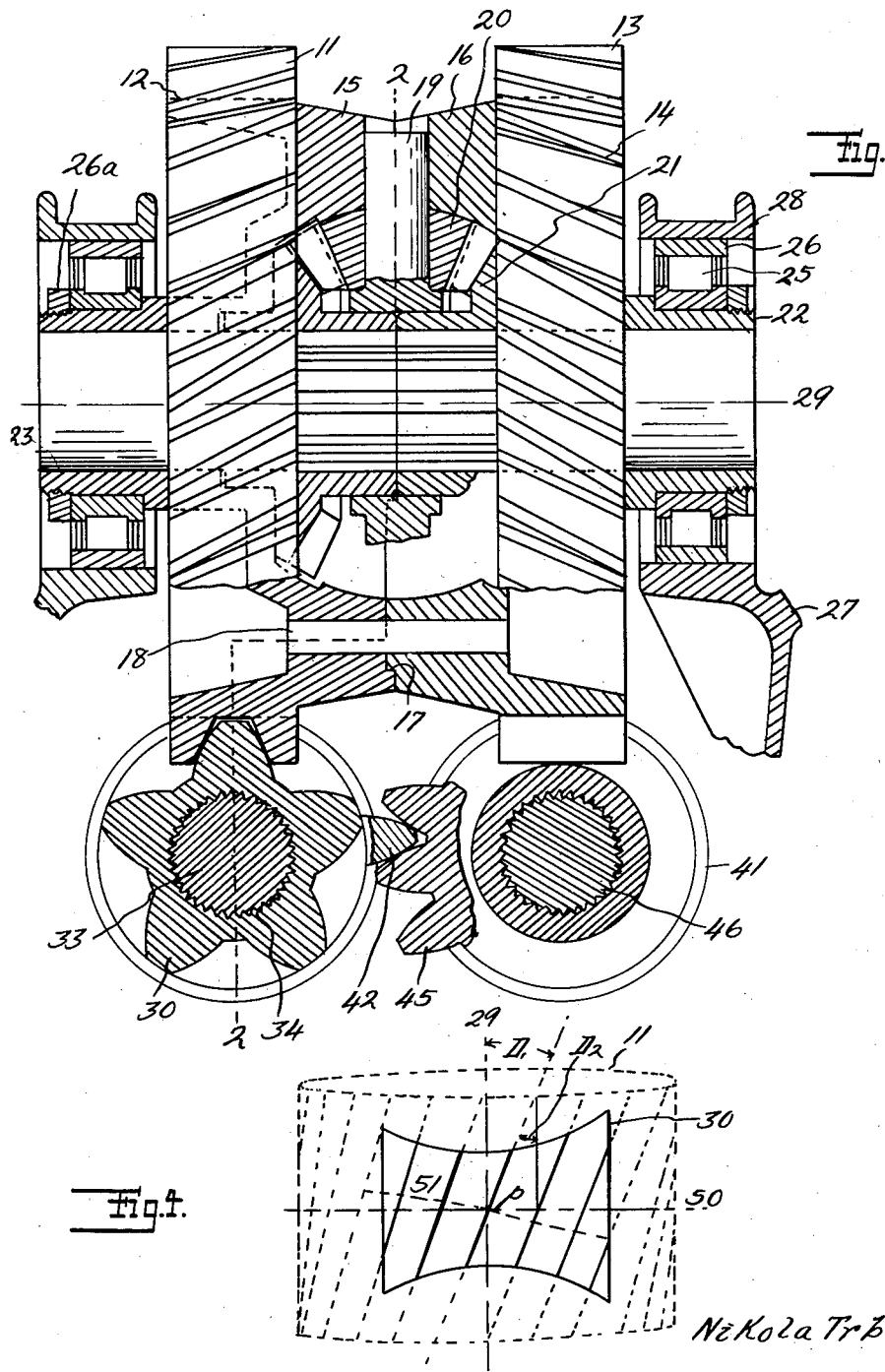

As shown in Figures 1 and 2, the upper part of this mechanism comprises two helical wheels mounted together viz. the left hand wheel 11 having teeth 12 and the right hand wheel 13 having teeth 14. These two gears are similar to each other in all respects except the hand of helix which is left hand for one and right hand for the other. If so desired they may be made in one piece instead of two. Said gears are provided with the circular bosses 15 and 16 at the side facing the center of the drive to fit one into the other in the dovetail 17 and to be riveted together through the series of holes 18.

A differential mechanism comprising a spider 19, four epicyclic pinions 20 and two side gears 21 may be fitted in this unit when applied in an automotive axle. However, my gearing will operate also without the said differential similar to other types of worm gearing.

Each gear 11 and 13 is provided with an outwardly facing shell-like boss 22 having a hole 23 to admit the axle shaft and fitting at its outer circumference into the inner race 24 of the roller bearing. Two such bearings are provided, one on each side, said bearings comprising the inner race 24, a set of rollers 25 and the outer race 26. The rollers are permitted to float along the axis 29 through a short distance, about .020". The nuts 26a prevent the races 24 from drifting.

The lower part of the mechanism containing the two globoid worms is mounted in the carrier 27 in which also the upper portion just described rotates. The half shells 28 fit over the outer races 26 and are bolted to the carrier 27 (bolting not shown). The globoid worms 30 and 31 having spiral threads 32 of a concave profile in the axial plane are of opposite hands, but otherwise similar and are arranged with their shafts 33 and 46 parallel, right hand worm to mesh with the right hand wheel and vice versa.

The rotatable mounting of the worms 30 and 31 in the carrier 27 is conventional. The end thrusts in both directions (along the worm axes) are taken by twin taper roller bearings 35 housed in a removable cap 36 and held from drifting by means of the nuts 37. The body of the worm 30 is bronze (the wheels 11 and 13 being hardened steel), is pressed upon the serrations 34 with a hydraulic pressure of about 60 tons, (heated at 450° F., and in a raw condition) and is finished afterwards. The front end of the shaft 33 is provided with ten equispaced splines 39 and fits into the bearings 40 and 41 and the spur gear 42.

Figure 3 diagrammatically shows the hook-up of the worms 30 and 31 by means of the two similar spur gears 42 and 45. The engine power is applied to the extremity 43 of the spindle 33, thus rotating the said spindle in the direction of the arrow 44 and the spindle 46 in the oppositely directed arrow 47. This will cause the worm spirals 30 and 31 to advance both in the same direction as shown by the arrows 48 and 49.

In Figure 4, the axis 50 of the worm 30 is at right angles to the axis 29 of the wheel 11 and the corresponding helix angles $D_1$ and $D_2$ are the same for both members. The line of action is along the skew line 51 at which the normal pitch P is the same for both. In generating the worm 30 I insure the fact that the worm threads will always tangentially engage the wheel teeth under any conditions likely to arise in practice, first, by employing a cutter by one or two teeth greater than the mating wheel 11 and, second, by passing the cutter across the worm threads transversely to the axis. The tooth curves are involutes as shown in Figure 2. The somewhat complicated theory of this improvement whereby both the wheel and the worm are permitted a limited displacement in any direction whatever without losing the tangential nature of contact is fully discussed in my above mentioned application, Serial No. 436,571.

The formation of wheel tooth surfaces is illustrated in Figure 5. The base helix 53 is wound upon the cylinder 52 of a radius $a$, and the straight line AB rolls upon the same always remaining tangent to the said base helix. The width of face of the wheel 11, Figures 1 and 4, is selected wide enough to overlap the zone of contact 51 above and below the pitch line 50. By this means a pitting and indentations in the smooth bronze surfaces of the worm under load are prevented as the hard and highly polished wheel tooth surfaces overlap the said bronze surfaces in all directions. This effect can not be obtained in standard worm gears in which the wheel does not overlap the worm. I obtain the required overlapping of steel over the bronze by using only a minimum quantity of bronze. In such a case the point A will describe an involute 54 having a base radius $a$ and lying in a plane 57 perpendicular to the axis 29. The generators AB, A'B', etc., form an involute helicoid, the tooth surface in this construction.

If I now draw a line AC perpendicular to AB and tangent to the same base cylinder 52, the said line AC will be a normal of the helicoid at the point A. A formal mathematical proof of this is too complicated to be given here, but it is sufficient to point out that according to the supposition the triangle BAC has a right angle at A, the line AE thus becoming a projection of either AB or AC. The tangent 55 of the involute 54 is perpendicular to AE, hence it is also perpendicular to both AB and AC, but the plane formed by the intersecting lines BA and 55 is a tangent plane to the helicoid, from which follows that the line AC being perpendicular to two lines in the said plane must also be perpendicular to any other line in the said plane, i. e. it is the normal of the surface.

I shall now show that in this construction the end thrust $P_0$ is always constant for a constant torque. The practical consequence of this is important because it permits me to design a twin worm drive in which there is no thrust whatever in the wheel axis and in which the torque is split exactly into halves between the two members automatically, instantaneously and without the use of any special balancing devices whatever. This could not be done prior to my invention.

The normal tooth load $P_n$ is always transmitted in the direction of the common normal A $O_1$ $O_2$, Figure 6. Let in Figure 7 the involute GH be subject to a number of perpendicular forces P, P' etc., acting at radii $r$, R', etc., from the fulcrum F. Then the torque T will be equal to $$T = rP \cos \alpha + r'P' \cos \alpha' + \ldots \quad (1)$$

the right hand side of the equation expressing the sum of the moments about F.

But in involutes (and no other curves)

$$r \cos \alpha = r' \cos \alpha' = a \quad (2)$$

a constant, from which $$T = a(P + P' + \ldots) \quad (3)$$

i. e. the torque is determined from the base radius and the sum of the normal forces alone, but not from their (variable) distances from the fulcrum.

Turning now to helicoids, Figure 8, the contact is at the point A and AC is the normal to the surface as already explained in connection with the Figure 5. The angle $ABE = \gamma_0$ is the base helix angle and this quantity is constant for any point of the gear tooth surfaces whatever.

In Figure 9 the helix angles of the gear $\gamma$, $\gamma'$, etc., are variable, their respective values being $$\tan \gamma = \frac{2r\pi}{L} \quad (4)$$

$$\tan \gamma' = \frac{2r'\pi}{L} \quad (5)$$

etc., where L is the lead of all helixes. But from (2)

$$r \cos \alpha = r' \cos \alpha' = a$$

and from Figure 5

$$\tan \gamma_0 = \frac{AE}{EB}$$

where AE is the developed arc of the base circle 57. For one full revolution of the line AE its length will become $2a\pi$ and that of the line EB will be equal to the lead of helix L, from which $$\tan \gamma_0 = \frac{2a\pi}{L} \quad (6)$$

and $$\tan \gamma_0 = \tan \gamma \cos \alpha = \tan \gamma' \cos \alpha' \quad (7)$$

In Figure 8 the angle CAB is 90° and if the line AE be selected numerically equal the sum of the forces P, P', etc., then the line AC will be equal to the normal tooth load $P_n$ $$P_n = \frac{P+P'+\ldots}{\cos \gamma_0} \quad (8)$$

The end thrust $P_0$ will be numerically equal to the length of the line EC, that is $$P_0 = (P+P_2+\ldots) \tan \gamma_0 \quad (9)$$

and from the Equation (3)

$$P_0 = \frac{T \tan \gamma_0}{a} \quad (10)$$

proving that the end thrust is unaffected by the manner in which the load may be distributed over the entire tooth faces.

Taking now two wheels together, one right hand and one left hand, Figure 10, and permitting them to float along the axis 29 they cannot be in equilibrium unless the end thrust $P_0'$ in one exactly balances the end thrust $P_0''$ in the other, i. e.

$$P_0' = -P_0'' \quad (11)$$

from which and the Equation 10 it follows that each wheel takes exactly one-half of the total torque.

It may happen that due to the inaccuracies of manufacture and mounting the quantities $a$ and $\gamma_0$ in Equation 10 are not strictly constant but fluctuate. In any such event an ordinary worm gear (in which both the worm and the wheel are rigidly mounted) may develop excessive tooth pressures leading to pitting and mashing up of the surfaces. In my improved gear this cannot happen because if the tooth pressure accidentally and locally increases in one gear, both gears will axially move over until the said pressure is equalized and thereby reduced.

In conclusion, I shall explain the method of assembling this unit. As shown in Figure 11, the gears 42 and 45 each have 19 teeth and the spline shafts 39 and 39a each have 10 splines, thus giving 190 possible combinations in which the said gears may be put together. This enables me to cut the teeth in all members without any predetermined plan or limitation as to where the spacing of the said teeth should begin in relation with the circumference of the said toothed members. In assembling, I first mount the worms and wheels to mesh properly and then I slip the gears 42 and 45 upon their corresponding splines by trial.

What I claim as my invention is:

1. A worm drive comprising two helical gears, one right hand and one left hand, affixed to a common axis, two globoid worms disposed with their axes parallel and meshing with the said two gears, means for rotating the worms in unison in two opposite directions and bearings in the first axis permitting the said gears to longitudinally float through a limited swing in the direction of said axis thus equalizing the tooth loads in the two mating pairs.

2. A worm drive comprising two helical gears having the same pitch, pressure and helix angles but opposite hands of helix affixed to an axis, two mating globoid worms having concave thread contours in the axial plane and corresponding to an inverted involute, means for rotating the worms in unison and in two opposite directions and bearings permitting a displacement to the said gears along their axis, thus equalizing the tooth loads and torques in both pairs.

3. A worm drive comprising two involute helical gears similar in their tooth characteristics except the hand of helix, a rotary axis to which the said gears are affixed, means permitting the said axis to longitudinally oscillate, two globoid worms having concave thread contours and generated from a base cylinder, the axis of which is parallel to the first axis and gearing interconnecting the said two worms in such a manner that they rotate in unison but in opposite directions.

4. A worm drive comprising two pairs of mating involute helical gears and globoid worms having opposite hands of helix and gearing interconnecting the said two worms, in which the tooth curves of the two gears are involutes generated from a base circle and the curves of the worms are inverted involutes generated from another base circle of a larger radius, in which the gear members are permitted to oscillate in unison along their common axis and in which the gear teeth are uniformly twisted and of the same cross section throughout their lengths thus preserving the tangential nature of contact throughout a limited accidental displacement of any member and in any direction whatever and also automatically equalizing the tooth loads and torques in both pairs at every instant.

5. A worm drive in which the end thrust in the gear member is eliminated comprising a rotatable and axially floating double helical gear having right and left hand sections and two mating globoid worms arranged with their axes in two parallel planes, engaging the corresponding sections of the said gear member and rotatable in unison but in opposite directions, the formation of the mating tooth faces being such that the normals at any point of contact are all equidistant from and inclined at the same angle relative to the axis of the gear member.

6. A worm drive comprising a globoid worm made of an antifriction metal such as bronze and a mating wheel made of a hard substance such as steel in which the zone of contact is disposed in a direction longitudinal of the worm axis and the steel member overlaps the bronze surfaces in all directions.

7. A mating pair of worm gears comprising a smaller member made of an antifriction substance and a larger member made of steel having their teeth so formed that the zone of contact extends substantially along the axis of the smaller member and the normals drawn at any point of contact are substantially equidistant from the axis of the larger member and are inclined at a substantially constant angle thereto, thereby insuring an overlapping of the harder mating substance over the softer one.

8. An axle drive gearing comprising a globoid worm and a mating worm wheel in which the zone of contact is disposed in a direction longitudinal of the warm axis and the worm wheel overlaps the worm in all directions, the worm wheel surface being of a hardened steel and the worm surface being of bronze.

9. A worm drive comprising two co-axial helical gears constructed of a hard substance such as steel, said gears having the same pitch, pressure and helix angles but opposite hands of helix, two mating globoid worms constructed of an antifriction metal such as bronze, said worms having concave thread contours in the axial plane and corresponding to an inverted involute, means for rotating the worms in unison and in two opposite directions and bearings permitting a displacement to the said gears along their axis, thus equalizing the tooth loads and torques in both pairs.

NIKOLA TRBOJEVICH.